US010841665B2

(12) United States Patent
Harron et al.

(10) Patent No.: US 10,841,665 B2
(45) Date of Patent: *Nov. 17, 2020

(54) COMPUTING SYSTEM WITH CONTENT-CHARACTERISTIC-BASED TRIGGER FEATURE

(71) Applicant: Gracenote, Inc., Emeryville, CA (US)

(72) Inventors: Wilson Harron, Berkeley, CA (US); Konstantinos Antonios Dimitriou, Berkeley, CA (US)

(73) Assignee: The Nielsen Company (US) LLP, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/597,597

(22) Filed: Oct. 9, 2019

(65) Prior Publication Data
US 2020/0045380 A1 Feb. 6, 2020

Related U.S. Application Data

(63) Continuation of application No. 15/399,415, filed on Jan. 5, 2017, now Pat. No. 10,484,758.
(Continued)

(51) Int. Cl.
H04N 21/84 (2011.01)
H04N 21/61 (2011.01)
(Continued)

(52) U.S. Cl.
CPC ......... *H04N 21/84* (2013.01); *G06K 9/00718* (2013.01); *G06K 9/00744* (2013.01);
(Continued)

(58) Field of Classification Search
CPC .... H04N 21/254; H04N 21/442; H04N 21/81; H04N 21/234
See application file for complete search history.

(56) References Cited

U.S. PATENT DOCUMENTS 8,756,623 B2 6/2014 Park et al.
9,071,869 B2 6/2015 Park et al.
(Continued)

FOREIGN PATENT DOCUMENTS

CN 103002328 A 3/2013
CN 103814569 A 5/2014
(Continued)

OTHER PUBLICATIONS

International Search Report and Written Opinion from International Application No. PCT/US2017/012338, dated Mar. 24, 2017.

*Primary Examiner* — Joshua D Taylor
(74) *Attorney, Agent, or Firm* — McDonnell Boehnen Hulbert & Berghoff LLP

(57) ABSTRACT

In one aspect, an example method includes (i) receiving, by a computing system, media content; (ii) generating, by the computing system, a fingerprint of a portion of the received media content; (iii) determining, by the computing system, that the received media content has a predefined characteristic; (iv) responsive to determining that the received media content has the predefined characteristic, transmitting, by the computing system, the generated fingerprint to a content identification server to identify the portion of the received media content; and (v) performing an action based on the identified portion of media content.

20 Claims, 4 Drawing Sheets

Related U.S. Application Data

(60) Provisional application No. 62/275,081, filed on Jan. 5, 2016.

(51) Int. Cl.

| | | |
|---|---|---|
| *H04N 21/234* | (2011.01) | |
| *G06K 9/00* | (2006.01) | |
| *H04N 21/81* | (2011.01) | |
| *H04N 21/845* | (2011.01) | |
| *H04N 21/44* | (2011.01) | |
| *H04N 21/242* | (2011.01) | |
| *H04N 21/438* | (2011.01) | |
| *H04N 21/475* | (2011.01) | |
| *G06N 20/00* | (2019.01) | |

(52) U.S. Cl.
CPC ... *G06K 9/00758* (2013.01); *H04N 21/23418* (2013.01); *H04N 21/23424* (2013.01); *H04N 21/242* (2013.01); *H04N 21/4383* (2013.01); *H04N 21/44008* (2013.01); *H04N 21/4756* (2013.01); *H04N 21/6125* (2013.01); *H04N 21/812* (2013.01); *H04N 21/845* (2013.01); *G06N 20/00* (2019.01)

(56) References Cited

U.S. PATENT DOCUMENTS

| | | |
|---|---|---|
| 9,301,008 B2 | 3/2016 | Park et al. |
| 2005/0289583 A1 | 12/2005 | Chiu |
| 2006/0015902 A1 | 1/2006 | Matsuura et al. |
| 2006/0190976 A1 | 8/2006 | Chung |
| 2007/0112583 A1 | 5/2007 | Hua et al. |
| 2010/0329563 A1 | 12/2010 | Luo et al. |
| 2011/0296452 A1 | 12/2011 | Yu et al. |
| 2012/0117584 A1 | 5/2012 | Gordon |
| 2013/0007201 A1 | 1/2013 | Jeffrey et al. |
| 2013/0058522 A1 | 3/2013 | Raesig et al. |
| 2014/0025485 A1 | 1/2014 | Niemeijer et al. |
| 2014/0195548 A1 | 7/2014 | Harron |
| 2014/0201787 A1 | 7/2014 | Neumeier et al. |
| 2015/0082338 A1 | 3/2015 | Logan |
| 2015/0256905 A1 | 9/2015 | Lee et al. |
| 2016/0127759 A1 | 5/2016 | Jung et al. |

FOREIGN PATENT DOCUMENTS

| | | |
|---|---|---|
| CN | 104412605 A | 3/2015 |
| CN | 104584571 A | 4/2015 |
| EP | 2760200 | 7/2014 |
| JP | 2009542081 | 11/2009 |
| JP | 201312092 | 1/2013 |
| JP | 201370268 | 4/2013 |
| JP | 2015530640 | 10/2015 |
| KR | 20110036407 | 4/2011 |
| KR | 20150104358 | 9/2015 |
| WO | WO2007148264 | 12/2007 |

COMPUTING SYSTEM WITH CONTENT-CHARACTERISTIC-BASED TRIGGER FEATURE

RELATED DISCLOSURE

This application is a continuation under 35 U.S.C. § 120 of U.S. application Ser. No. 15/399,415, filed Jan. 5, 2017, which claims the benefit of priority under 35 U.S.C. § 119(e) of U.S. Provisional Application No. 62/275,081, filed Jan. 5, 2016, the contents of both of which are incorporated herein by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a computing system, media content; (ii) generating, by the computing system, a fingerprint of a portion of the received media content; (iii) determining, by the computing system, that the received media content has a predefined characteristic; (iv) responsive to determining that the received media content has the predefined characteristic, transmitting, by the computing system, the generated fingerprint to a content identification server to identify the portion of the received media content; and (v) performing an action based on the identified portion of media content.

In another aspect, an example non-transitory computer-readable medium is disclosed. The computer-readable medium has stored thereon program instructions that upon execution by a processor, cause performance of a set of acts including (i) receiving, by a computing system, media content; (ii) generating, by the computing system, a fingerprint of a portion of the received media content; (iii) determining, by the computing system, that the received media content has a predefined characteristic; (iv) responsive to determining that the received media content has the predefined characteristic, transmitting, by the computing system, the generated fingerprint to a content identification server to identify the portion of the received media content; and (v) performing an action based on the identified portion of media content.

In another aspect, an example computing system is disclosed. The computing system is configured for performing a set of acts including (i) receiving, by the computing system, media content; (ii) generating, by the computing system, a fingerprint of a portion of the received media content; (iii) determining, by the computing system, that the received media content has a predefined characteristic; (iv) responsive to determining that the received media content has the predefined characteristic, transmitting, by the computing system, the generated fingerprint to a content identification server to identify the portion of the received media content; and (v) performing an action based on the identified portion of media content.

DETAILED DESCRIPTION

I. Overview

Figure 1:
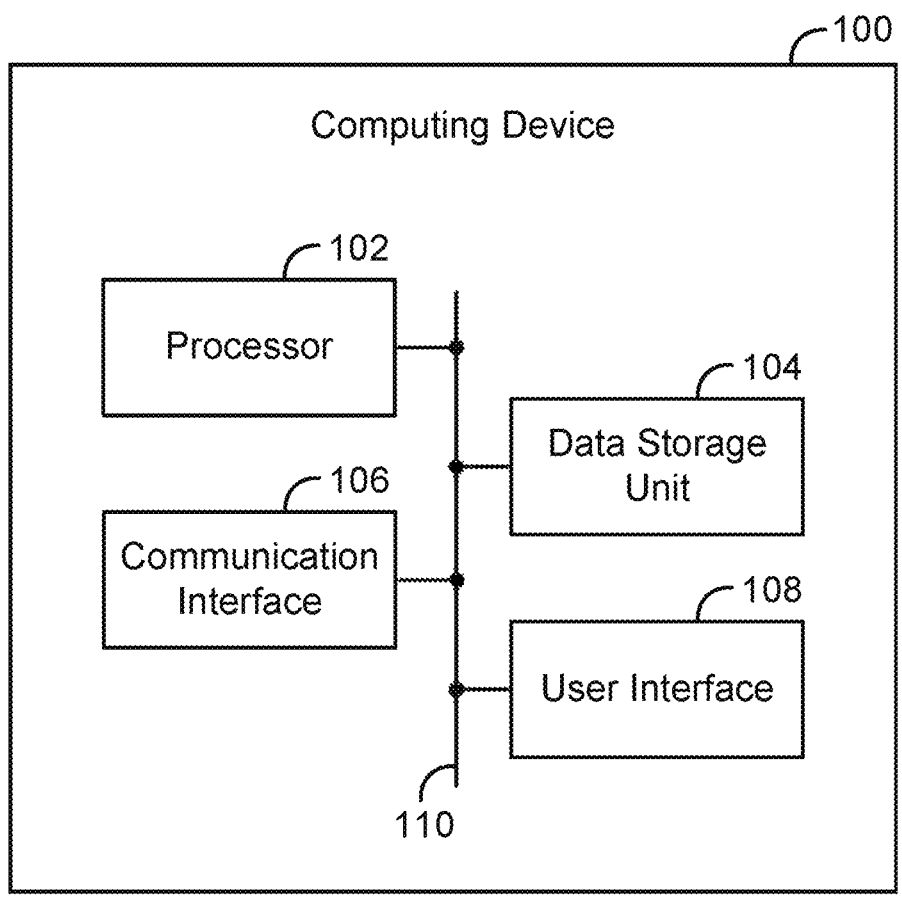
FIG. 1 is a simplified block diagram of an example computing device.

Within a media content delivery and presentation system, a receiver (e.g., a cable receiver or a satellite receiver) can provide media content to a media presentation device (e.g., a television), which can receive and present the media content for an end-user.

In some instances, it can be desirable to identify the media content that the media presentation device is receiving and/or presenting. Among other things, this can allow an entity such as the media presentation device to perform an action based on the identified media content. For example, based on the identified media content, the media presentation device can cause supplemental content (e.g., a contextually appropriate advertisement) to be presented in conjunction with the media content being presented by the media presentation device (e.g., by overlaying the supplemental content on the presented media content).

In one example, a fingerprint-based technique can be used to identify the media content. As such, the media presentation device can receive media content, and can generate a fingerprint of the received media content. The media presentation device can then transmit the fingerprint to a content identification server for analysis, which can use the fingerprint to identify the media content. Based on the identified media content, the content identification server can take, or cause to be taken, one or more actions, such as causing the media presentation device to perform the action described above.

As noted above, the media presentation device can generate and/or transmit a fingerprint to the content identification server periodically or from time so that the media content can be identified. In practice, many media presentation devices can generate and/or transmit fingerprints in this manner, which collectively can strain operation of the content identification server. Thus, in some cases, it may be desirable to reduce the number of fingerprints that a given media presentation device generates and/or transmits to the content identification server for analysis. However, this can potentially reduce the ability of the content identification server to accurately identify the media content being presented on the media presentation device at a given time.

In one aspect, the media presentation device can help address the issues discussed above by determining a characteristic of the media content and using the determination as a trigger event that causes the media presentation device to transmit a fingerprint to the content identification server.

To begin with, the media presentation device can receive media content, such as from the receiver. The media content can include multiple portions, such as a first portion and a second portion. In one example, each of the first and second portions can be a logically self-contained unit of media content that is separate and distinct from the other. For instance, in one example, the first portion can be a program segment (e.g. a segment of a television show) and the second portion can be a commercial.

The receiver can provide, and the media presentation device can receive, the first and second portions as a temporal sequence. Thus, the receiver can provide the first portion before providing the second portion. Likewise, the media presentation device can receive the first portion before receiving the second portion.

After the media presentation device receives the first portion, the media presentation device can generate a first fingerprint and can transmit the generated first fingerprint to the content identification server to identify the first portion. Then, the content identification server, the media presentation device, and/or another entity can perform an action, based on the identified first portion.

Similar to with the first portion, the media presentation device can generate a second fingerprint of the second portion. The media presentation device can then determine that the received media content (which includes the first and second portions) has a particular characteristic. And responsive to determining that the received media content has the predefined characteristic, the media presentation device can transmit the generated fingerprint to the content identification server to identify the second portion. Then, the content identification server, the media presentation device, and/or another entity can perform an action, based on the identified second portion.

The predefined characteristic can vary to suit a desired configuration. For instance, in one example, the predefined characteristic can be that the first portion and the second portion lack a threshold extend of similarity with each other. This can evidence the fact that each portion is a logically self-contained unit of media content that is separate and distinct from the other. In various examples, this can be representative of the fact that (i) the first portion is a program segment and the second portion is a commercial, (ii) the first portion is a first commercial and the second portion is a second commercial that is different from the first commercial, (iii) the first portion is a commercial and the second portion is a program segment, or (iv) the first portion is a first program segment and the second portion is a second program segment that is different from the first program segment.

As noted above, the receiver can provide, and the media presentation device can receive, media content that includes a first portion and a second portion. In some cases, for various reasons, the media content can include non-substantive media content that separates the first and second portions. For example, in the case where the media content is video content that includes a program segment and a commercial, the video content can also include some substantially black content (e.g., one or two seconds of video content that is substantially black) that separates the program segment and the commercial. Such non-substantive content can typically separate two otherwise adjacent logically self-contained units of media content in this way.

In recognition of this, in one example, the predefined characteristic can be that the first portion includes a threshold extent of non-substantive media content. As such, in the case where the media content includes the first portion, the second portion, and a third portion that includes non-substantive content, and where the receiver receives the first portion, the third portion, and the second portion, in that order, the media presentation device can determine that the received media content has the predefined characteristic by determining that the third portion includes a threshold extent of non-substantive media content.

To allow the media presentation device to determine that the received media content has the predefined characteristic, a training system (which can be the media presentation device or another entity) can employ a machine leaning technique to train a classifier to detect whether the media content (or a portion thereof) has the predefined characteristic. Once the classifier is trained, in one example, the media presentation device can determine that the received media content has the predefined characteristic by using the trained classifier.

In practice, the media presentation device can continually determine that (different portions of) received media content has a predefined characteristic, and can responsively generate a fingerprint and/or transmit the generated fingerprint to the content identification server as described above.

This can help reduce the number of instances where the media presentation device transmits a fingerprint to the content identification server for analysis, which can help reduce the chance of the content identification server facing strained operation. This can also generally reduce the use of network and other types of computing resources.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a High-Definition Multimedia Interface (HDMI). In another example, the communication interface 106 can be a wireless interface, such as a cellular, or WI-FI. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a television, a set-top box, a workstation terminal, a desktop computer, a laptop, a tablet, and/or a mobile phone.

B. Media Content Delivery and Presentation System

Figure 2:
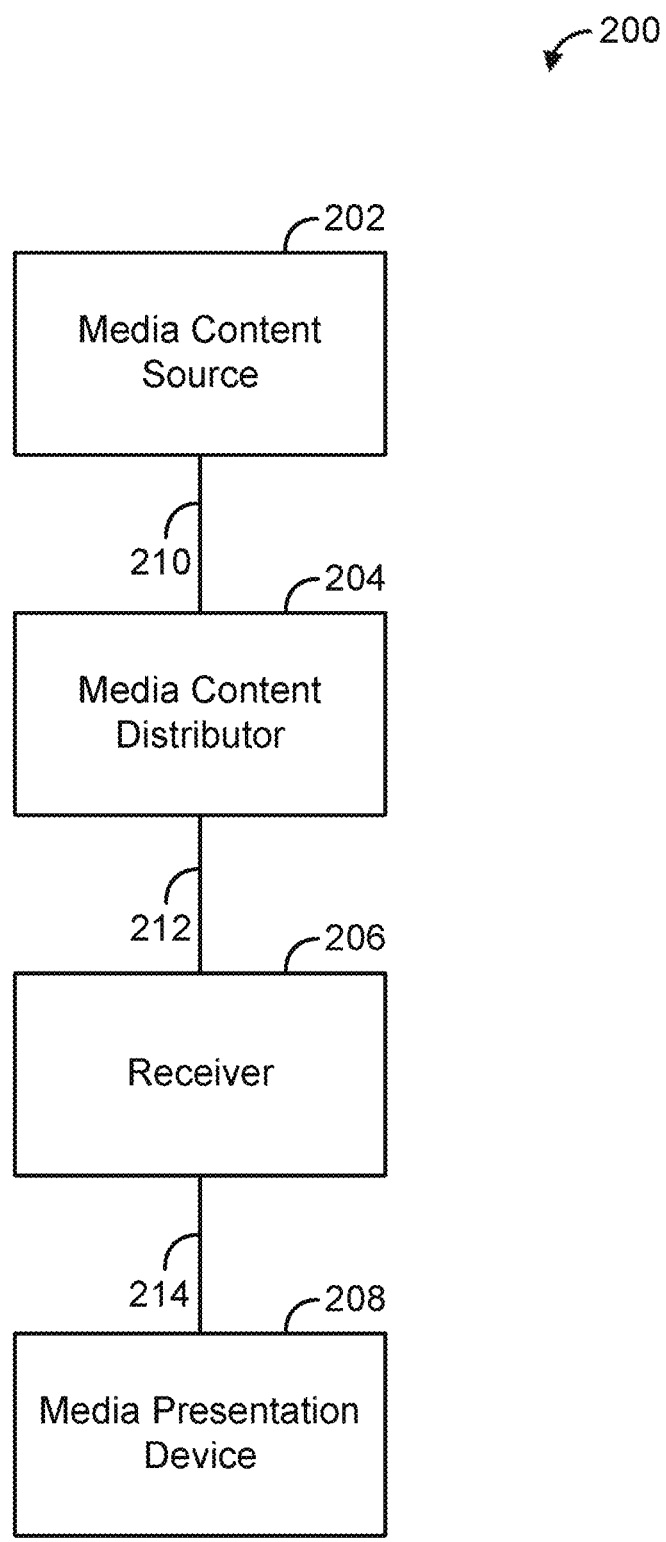
FIG. 2 is a simplified block diagram of an example media content delivery and presentation system.

FIG. 2 is a simplified block diagram of an example media content delivery and presentation system 200. The system 200 can perform various acts and/or functions related to the delivery and/or presentation of media content (e.g., audio content and/or video content), and can be implemented as a computing system. In this disclosure, the term "computing system" means a system that includes at least one computing device. In some instances, a computing system can include one or more other computing systems.

The system 200 can include various components, such as a media content source 202, a media content distributor 204, a receiver 206, and/or a media presentation device 208, each of which can be implemented as a computing system. The system 200 can also include a connection mechanism 210, which connects the media content source 202 with the media content distributor 204; a connection mechanism 212, which connects the media content distributor 204 with the receiver 206; and a connection mechanism 214, which connects the receiver 206 with the media presentation device 208. In practice, the system 200 is likely to include many of some or all of the example components described above.

The media content source 202 and the media content distributor 204 can each take various forms. For example, the media content source 202 can be a broadcaster and/or a web server, and the media content distributor 204 can be a multi-channel distributor (e.g., a cable provider, satellite provider, over-the-air broadcast provider, or a web aggregator). The receiver 206 and the media presentation device 208 can each take various forms as well. For example, the receiver can be a cable receiver, a satellite receiver, an over-the-air broadcast receiver, and/or a streaming media box, and the media presentation device 208 can be a television or another display device, or a loudspeaker or another audio device.

C. Media Content Identification System

Figure 3:
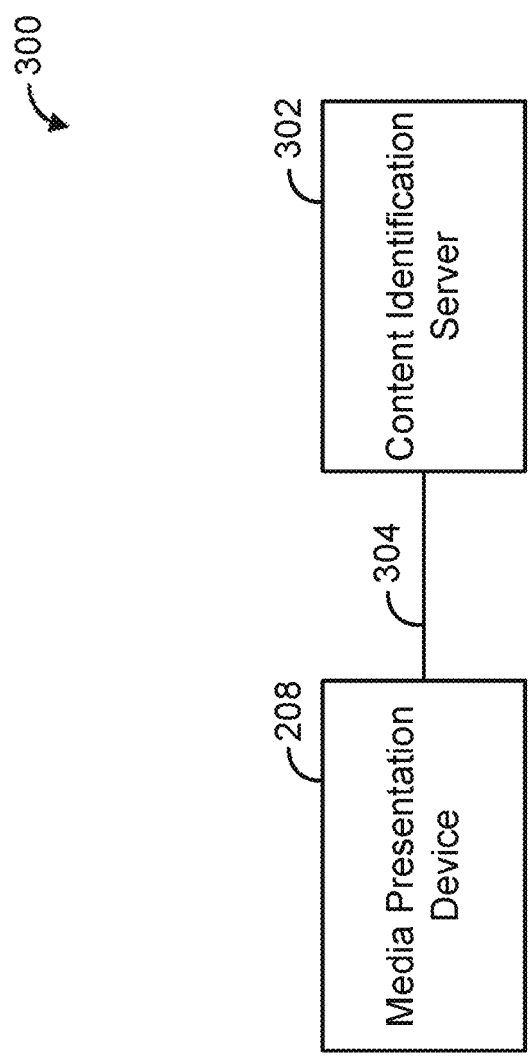
FIG. 3 is a simplified block diagram of an example media content identification system.

FIG. 3 is a simplified block diagram of an example media content identification system 300. The system 300 can perform various acts and/or functions related to media content identification (sometimes referred to as automated content recognition (ACR)), and can be implemented as a computing system.

The system 300 can include various components, such as the media presentation device 208 and a content identification server 302, which can be implemented as a computing system. The system 300 can also include a connection mechanism 304, which connects the media presentation device 208 with the content identification server 302.

III. Example Operations

Referring again to FIG. 2, within the system 200, the media content source 202 can provide media content to the media content distributor 204, which can provide the media content to the receiver, which can provide the media content to the media presentation device 208, which can present the media content to an end-user.

In practice, the system 200 can include many of some or all of the components described above, which can allow media content to be presented to many end-users. Thus, in one example, the media content sources 202 can be national broadcasters, such as ABC, NBC, CBS, FOX, HBO, and CNN, and the media content distributors 204 can be local affiliates and/or other local content distributors in particular designated market areas (DMAs). Further, the receivers 206 and the media presentation devices 208 can be located at customer premises, such as homes or business establishments. With these or other arrangements, the media content sources 202 can deliver media content to the media content distributors 204 for distribution to the receivers 206, and the media content distributors 204 can distribute the media content to the receivers 16 on discrete channels (e.g., particular frequencies). Each receiver 206 can then respond to user input or one or more other trigger events by tuning to a selected channel and transmitting to a media presentation device 208 the media content that is arriving on the selected channel. The media presentation device 208 can then receive and present the media content (e.g., by displaying or otherwise presenting the content).

In some instances, it can be desirable to identify the media content that the media presentation device 208 is receiving and/or presenting. Among other things, this can allow an entity such as the media presentation device 208 to perform an action based on the identified media content. For example, based on the identified media content, the media presentation device 208 can cause supplemental content (e.g., a contextually appropriate advertisement) to be presented in conjunction with the media content being presented by the media presentation device 208 (e.g., by overlaying the supplemental content on the presented media content).

In one example, a fingerprint-based technique can be used to identify the media content. An example of this will now be described. Referring again to FIG. 3, the media presentation device 208 can receive media content, and can generate a fingerprint of the received media content. In one example, the media presentation device 208 can generate the fingerprint while the media presentation device is receiving the media content (e.g., from the receiver 206) and/or while the media presentation device is processing the media content for presentation. The media presentation device 208 can apply any media fingerprinting process now known or later developed to generate a fingerprint of the media content.

In practice, the media presentation device 208 can generate such fingerprints as a fingerprint stream on an ongoing basis, such as on a per frame basis (e.g., on a per key-frame basis) or other basis. The media presentation device 208 can also transmit the fingerprint to the content identification server 302 for analysis. By way of example, the media presentation device 208 can periodically or from time to time generate and/or transmit to the content identification server 302 a fingerprint representing a latest frame, series of frames or other portion of the media content being received and/or presented by the media presentation device 208. In particular, the media presentation device 208 can generate a message carrying the latest generated fingerprint and can transmit the message to the content recognition server's IP address. Such a message could implicitly or explicitly indicate the current time, thus establishing a time at which the media content at issue is being received and/or presented by the media presentation device 208. The content identification server 302 can thereby receive the fingerprint and time information for analysis.

Further, the content identification server 302 can compare the fingerprint of the media content being received and/or presented by the media presentation device 208 with reference fingerprints accessible by the content identification server 302 using any fingerprint comparison process now known or later developed.

Each of the reference fingerprints can correspond with respective data that identifies media content from which the reference fingerprint was generated, and that is accessible by the content identification server 302. In one example, the content identification server 302 can use mapping data to map a given reference fingerprint to respective data that identifies the corresponding media content. The data can identify the media content in various ways, such as by specifying a title, unique identifier, or other data associated with the media content. Thus, by determining that there is a match between a fingerprint representing media content received and/or presented by the media presentation device 208, and a reference fingerprint, the content identification server 302 can use the data corresponding to the reference fingerprint to identify the media content.

Based on the identified media content, the content identification server 302 can take, or cause to be taken, one or more actions. For example, the content identification server 302 can take action based on the identified media content, or the content identification server 302 can signal to another entity, perhaps to the media presentation device 208, to cause the other entity to take action based on the identified media content.

For example, the content identification server 302 can record the fact that the media presentation device 208 is presenting the identified media content as part of a content rating or analytics system to measure the extent to which media content is being received and/or presented by media presentation devices. For instance, the media presentation device 208 can regularly (e.g., periodically) report to the content identification server 302 a fingerprint of the media content that the media presentation device 208 is receiving and/or presenting, and the content identification server 302 can carry out processes such as those discussed herein to determine media content being identified. Each time the content identification server 302 thus identifies media content being received and/or presented by the media presentation device 208, the content identification server 302 can add to a count or other statistic of the media content being received and/or presented. Further, these counts or other statistics can be per media presentation device (as device-specific viewing analytics), indicating the extent to which the media presentation device receives and/or presents the media content.

As another example, the content identification server 302 can responsively cause the media presentation device 208 to present supplemental content, such as an overlay advertisement as discussed above, among other possibilities, possibly as a replacement for one or more portions of the media content. For instance, given an identification of the media content at issue, the content identification server 302 can generate or select (e.g., from a server's data storage unit) particular supplemental media content associated specifically with the identified media content (and perhaps further based on profile data (e.g., device-specific viewing analytics) associated with the particular media presentation device 208) and can transmit the supplemental media content to the media presentation device 208 for the media presentation device 208 to present in conjunction with the media content that the media presentation device 208 is receiving from the receiver 206. The media presentation device 208 can thus receive the supplemental media content from the content identification server 302 and present it in conjunction with the media content that the media presentation device 208 is receiving from the receiver 206.

As noted above, the media presentation device 208 can generate and/or transmit a fingerprint to the content identification server 302 periodically or from time so that the media content can be identified. In practice, many media presentation devices 208 can generate and/or transmit fingerprints in this manner, which collectively can strain operation of the content identification server 302. Thus, in some cases, it may be desirable to reduce the number of fingerprints that a given media presentation device 208 generates and/or transmits to the content identification server 302 for analysis. However, this can potentially reduce the ability of the content identification server 302 to accurately identify media content being presented on the media presentation device 208 at a given time.

To illustrate how this can be a problem, consider the following scenario. The receiver 206 provides media content to the media presentation device 208, and the media presentation device 208 receives the same. The media content includes at least two portions, including a first portion and a second portion, which the receiver 206 provides, and the media presentation device 208 receives, as a temporal sequence. The first portion is a program segment (e.g. a segment of a television show) and the second portion is a commercial that follows the program segment.

As noted above, the receiver 206 provides, and the media presentation device 208 receives, the first and second portions of media content as a temporal sequence. Thus, the receiver 206 provides the first portion before providing the second portion. Likewise, the media presentation device 208 receives the first portion before receiving the second portion. In particular, at time $T_1$, the receiver 206 starts to provide the first portion to the media presentation device 208, and the media presentation device 208 receives the same. Then, five seconds later, at time $T_2$, the receiver starts to provide the second portion to the media presentation device 208, and media presentation device 208 receives the same. In the case where the media presentation device 208 is configured to generate and transmit fingerprints to the content identification server 302 at a period interval of once every thirty seconds, and the media presentation device 208 generates and transmits a fingerprint at time $T_1$, the content identification server 302 can identify the first portion as soon as the media presentation device 208 begins receiving and/or presenting the first portion. However, because the media presentation device 208 does not generate and transmit the next fingerprint until twenty seconds later, the content identification server 302 cannot identify the second portion until at least twenty-five seconds after time $T_2$, that is, until at least twenty-five seconds after the media presentation device 208 starts receiving and/or presenting the second portion. This delay can reduce or potentially eliminate any benefit or value attained by performing an action based on the identified second portion of media content.

In one aspect, the media presentation device 208 can help address the issues discussed above by determining a characteristic of the media content and using the determination as a trigger event that causes the media presentation device 208 to transmit the fingerprint of the second portion to the content identification server 302. A method incorporating this feature will now be described.

To begin with, the media presentation device 208 can receive media content, such as from the receiver 206. The media content can include multiple portions, such as a first portion and a second portion. In one example, each of the first and second portions can be a logically self-contained unit of media content that is separate and distinct from the other. For instance, in one example, the first portion can be a program segment (e.g. a segment of a television show) and the second portion can be a commercial. In another example, the first portion can be a first commercial and the second portion can be a second commercial that is different from the first commercial. In still another example, the first portion can be a commercial and the second portion can be a program segment. In still another example, the first portion can be a first program segment and the second portion can be a second program segment that is different from the first program segment.

Within the media content, the transition from the first portion to the second portion can occur for various reasons. For example, the transition can result from a simple change in content being provided by a content source (e.g., the change from a program segment to a commercial, from a commercial to another commercial, from a commercial to a program segment, or from a program segment to another program segment). As another example, the transition can result from the receiver 206 performing a channel-change operation. For example, the receiver 206 can change from a first channel to a second channel in response to receiving a channel-change instruction from a remote controller being operated by an end-user (e.g., as a result of the end-user entering a channel number, pressing the up/down channel button, or pressing a guide button, pressing some navigation buttons, and then pressing an enter button). This can thus cause one of the transitions referenced above.

As noted above, the receiver 206 can provide, and the media presentation device 208 can receive, the first and second portions as a temporal sequence. Thus, the receiver 206 can provide the first portion before providing the second portion. Likewise, the media presentation device 208 can receive the first portion before receiving the second portion.

After the media presentation device 208 receives the first portion, the media presentation device 208 can generate a first fingerprint and can transmit the generated first fingerprint to the content identification server 302 to identify the first portion. Then, the content identification server 302, the media presentation device 208, and/or another entity can perform an action, such as any of the actions described above, based on the identified first portion.

Similar to with the first portion, the media presentation device 208 can generate a second fingerprint of the second portion. The media presentation device 208 can then determine that the received media content (which includes the first and second portions) has a particular characteristic. And responsive to determining that the received media content has the predefined characteristic, the media presentation device 208 can transmit the generated fingerprint to the content identification server 302 to identify the second portion. Then, the content identification server 302, the media presentation device 208, and/or another entity can perform an action, such as any of the actions described above, based on the identified second portion.

The predefined characteristic can vary to suit a desired configuration. For instance, in one example, the predefined characteristic can be that the first portion and the second portion lack a threshold extend of similarity with each other. In other words, the predefined characteristic can be that the first and second portions are sufficiently different from each other. This can evidence the fact that each portion is a logically self-contained unit of media content that is separate and distinct from the other. In various examples, this can be representative of the fact that (i) the first portion is a program segment and the second portion is a commercial, (ii) the first portion is a first commercial and the second portion is a second commercial that is different from the first commercial, (iii) the first portion is a commercial and the second portion is a program segment, or (iv) the first portion is a first program segment and the second portion is a second program segment that is different from the first program segment.

As such, in one example, the media presentation device 208 can determine that the received media content has the predefined characteristic by determining that the first portion and the second portion lack a threshold extent of similarity with each other. The media presentation device 208 can determine this in various ways. For example, the media presentation device 208 can determine this by determining that the generated first fingerprint (of the first portion) and the generated second fingerprint (of the second portion) lack a threshold extent of similarity with each other. The media presentation device 208 can make this determination based on a comparison of the two fingerprints using any applicable technique now known or later developed.

In one example, this can involve the media presentation device 208 comparing corresponding portions of the fingerprints with each other to determine whether the portions are sufficiently different, perhaps in view of predefined tolerances. For example, for video content, the media presentation device 208 can conduct this analysis on a whole frame basis, comparing the first fingerprint of a first frame against a second fingerprint of a second frame, such as by computing a maximum deviation between the fingerprints and determining if the maximum deviation is beyond a predefined tolerance. Further, if the fingerprints are binary, this could be a Boolean determination, and if the fingerprints are more complex values, such as decimal values or vectors (e.g., grey values per video frame region), this can involve determining a distance between the values or vectors. Numerous other examples are possible as well.

As noted above, the receiver 206 can provide, and the media presentation device 208 can receive, media content that includes a first portion and a second portion. In some cases, for various reasons, the media content can include non-substantive media content that separates the first and second portions. For example, in the case where the media content is video content that includes a program segment and a commercial, the video content can also include some substantially black content (e.g., one or two seconds of video content that is substantially black) that separates the program segment and the commercial. Such non-substantive content can typically separate two otherwise adjacent logically self-contained units of media content in this way.

In recognition of this, in one example, the predefined characteristic can be that the first portion includes a threshold extent of non-substantive media content. As such, in the case where the media content includes the first portion, the second portion, and a third portion that includes non-substantive content, and where the receiver 206 receives the first portion, the third portion, and the second portion, in that order, the media presentation device 208 can determine that the received media content has the predefined characteristic by determining that the third portion includes a threshold extent of non-substantive media content. The media presentation device 208 can determine this in various ways. For example, the media presentation device 208 can generate a fingerprint of the third portion and can analyze various properties of the fingerprint (e.g., using any applicable technique now known or later developed) to determine whether the third portion includes a threshold extent of non-substantive media content.

To allow the media presentation device 208 to determine that the received media content has the predefined characteristic, a training system (which can be the media presentation device 208 or another entity) can employ a machine leaning technique to train a classifier to detect whether the media content (or a portion thereof) has the predefined characteristic. In one example, a training system can train a classifier by providing as input to the classifier, media content that includes a first portion and a second portion (and/or fingerprints of the same), and an indication of whether the first and second portions should be considered to lack a threshold extent of similarity. With this information, the classifier can configure itself to recognize instances where media content includes first and second portions that lack a threshold extent of similarity.

In another example, a training system can train a classifier by providing as input to the classifier, media content that includes a first portion (and/or a fingerprint of the same), and an indication of whether the first portion should be considered to include a threshold extent of non-substantive content. With this information, the classifier can configure itself to recognize instances where media content includes a first portion that includes a threshold extent of non-substantive content.

The training system can apply any machine learning classification technique (e.g., a technique based on neural network, support vector machines, and/or adaptive filters) now known or later developed to train a classifier to recognize these characteristics.

Once the classifier is trained, in one example, the media presentation device 208 can determine that the received media content has the predefined characteristic by using the trained classifier to determine that that the received media content has the predefined characteristic. The media presentation device 208 can do this by providing as input to the classifier the received media content and/or related data (e.g., a fingerprint of the received media content). The classifier can thus provide as output, an indication of whether the received media content has the predefined characteristic.

As noted above, responsive to the media presentation device 208 determining that the received media content has the predefined characteristic, the media presentation device 208 can transmit the generated second fingerprint to the content identification server 302 to identify the second portion of media content. Then, the content identification server 302, the media presentation device 208, and/or another entity can perform an action, such as any of the actions described above, based on the identified second portion of media content.

In some examples, the media presentation device 208 can generate fingerprints periodically or from time to time and can selectively transmit them to the content identification server 302 responsive to the media presentation device 208 determining that the received media content has a predefined characteristic. However, in other examples, the media presentation device 208 can selectively generate the fingerprints and also selectively transmit them to the content identification server 302, both responsive to the media presentation device 208 determining that the received media content has a predefined characteristic.

In some instances, the media presentation device 208 can generate the second fingerprint of the second portion of the received media content proximate a time that the media presentation device 208 determines that the received media content has the predefined characteristic, or perhaps at a time following a predefined time period (e.g., the media presentation device 208 can generate the fingerprint one second after the determination is made). Similarly, the media presentation device 208 can transmit the generated fingerprint proximate a time that the media presentation device 208 determines that the received media content has the predefined characteristic, or perhaps at a time following a predefined time period.

In practice, the media presentation device 208 can continually determine that (different portions of) received media content has the predefined characteristic, and can responsively generate a fingerprint and/or transmit the generated fingerprint to the content identification server 302 as described above. This can help reduce the number of instances where the media presentation device 208 transmits a fingerprint to the content identification server 302 for analysis, which can help reduce the chance of the content identification server 302 facing strained operation. This can also generally reduce the use of network and other types of computing resources. Further, by generating and/or transmitting fingerprints proximate a time when the content-characteristic-based determination is made, the media presentation device 208 can reduce delay in identifying media content as discussed above.

In some cases, in addition to the media presentation device 208 using the determination that the received media content has a predefined characteristic as a trigger event that causes the media presentation device 208 to transmit the generated fingerprint to the content identification server 302, the media presentation device 208 can also generate a fingerprint and/or transmit the generated fingerprint to the content identification server 302 on a periodic basis or from time to time (but perhaps less frequency than it otherwise would), serving as a hybrid approach.

Figure 4:
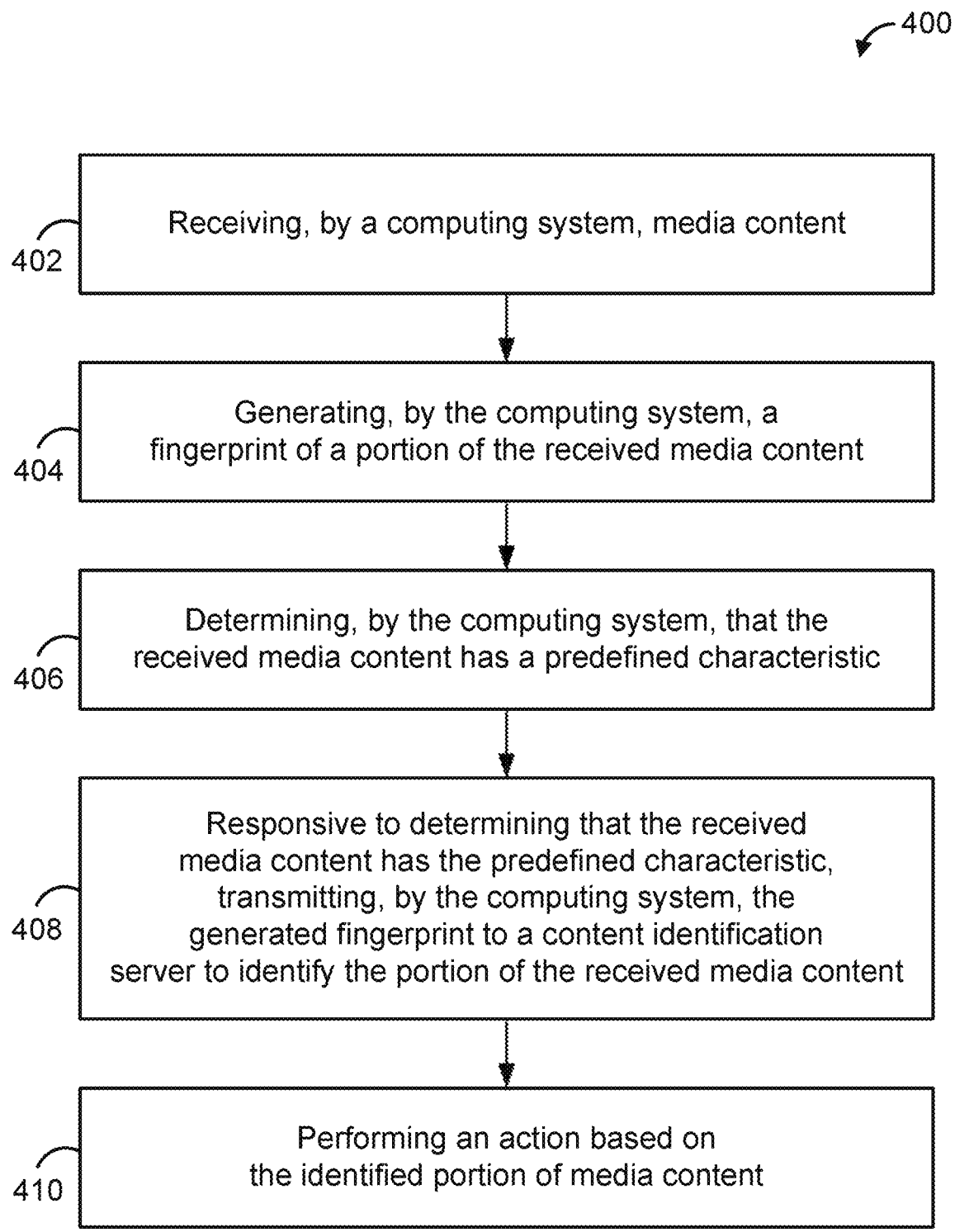
FIG. 4 is a flow chart of an example method.

FIG. 4 is a flow chart illustrating an example method 400. At block 402, the method 400 can include receiving, by a computing system, media content. At block 404, the method 400 can include generating, by the computing system, a fingerprint of a portion of the received media content. At block 406, the method 400 can include determining, by the computing system, that the received media content has a predefined characteristic. At block 408, the method 400 can include responsive to determining that the received media content has the predefined characteristic, transmitting, by the computing system, the generated fingerprint to a content identification server to identify the portion of the received media content. At block 410, the method 400 can include performing an action based on the identified portion of media content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    determining, by a computing system, that a first portion of media content includes a threshold extent of non-substantive media content;
    responsive to determining that the first portion of the media content includes the threshold extent of non-substantive media content, transmitting, by the computing system, a fingerprint associated with a second portion of the media content to a content identification server to identify the second portion of the media content; and
    performing an action based on the identified second portion of the media content.

2. The method of claim 1, further comprising receiving the media content from a receiver connected to the computing system.

3. The method of claim 1, wherein the computing system receives the first portion before receiving the second portion.

4. The method of claim 1, wherein (i) the first portion is a program segment and the second portion is a commercial, (ii) the first portion is a first commercial and the second portion is a second commercial that is different from the first commercial, (iii) the first portion is a commercial and the second portion is a program segment, or (iv) the first portion is a first program segment and the second portion is a second program segment that is different from the first program segment.

5. The method of claim 1, further comprising determining that the first portion and the second portion lack a threshold extent of similarity with each other.

6. The method of claim 5, wherein the fingerprint associated with the second portion is a second fingerprint, wherein the method further comprises:
    determining that a first fingerprint associated with the first portion and the second fingerprint associated with the second portion lack a threshold extent of similarity with each other.

7. The method of claim 5, wherein determining that the first portion and the second portion lack a threshold extent of similarity with each other further comprises determining, by a trained classifier of the computer system, that the first portion and the second portion lack a threshold extent of similarity with each other.

8. The method of claim 7, wherein the media content is video content and wherein determining that the first portion includes a threshold extent of non-substantive media content comprises determining that the first portion includes a threshold extent of substantially black video content.

9. The method of claim 1, wherein determining that the first portion includes a threshold extent of non-substantive media content further comprises determining, by a trained classifier of the computer system, that the first portion includes a threshold extent of non-substantive media content.

10. The method of claim 1, further comprising generating the fingerprint associated with the second portion of the media content responsive to determining that the first portion of the media content includes the threshold extend of non-substantive media content.

11. The method of claim 10, wherein generating the fingerprint associated with the second portion of the media content and transmitting the fingerprint to the content identification server to identify the second portion of the media content both occur proximate a time of the determining that the first portion of the media content includes the threshold extend of non-substantive media content.

12. The method of claim 1, further comprising:
    presenting, via a user interface of the computer system, the second portion of media content, and wherein taking action based on the identified second portion of media content comprises causing supplemental content to be presented in conjunction with the second portion of media content being presented by the user interface of the computer system.

13. The method of claim 1, wherein taking action based on the identified second portion of media content comprises recording presentation of the identified second portion of media content for use in a media content ratings system.

14. The method of claim 1, wherein the media content is video content.

15. A non-transitory computer-readable medium having stored thereon program instructions executable by a processor of a computing system for causing the computing system to perform acts comprising:
    processing received media content, wherein the media content comprises a first portion and a second portion;
    generating a fingerprint of the second portion of the media content;
    determining that the first portion of the media content includes a threshold extent of non-substantive media content;
    responsive to determining that the first portion of the media content includes the threshold extend of non-substantive media content, transmitting the generated fingerprint to a content identification server to identify the second portion of the media content; and
    causing performance of an action based on the identified second portion of the media content.

16. The non-transitory computer-readable medium of claim 15, wherein in receiving the media content, the instruction code is executable by the processor to cause the computing system to perform acts comprising: receiving the media content from a receiver connected to the computing system.

17. The non-transitory computer-readable medium of claim 15, wherein the instruction code is executable by the processor to cause the computing system to perform further acts comprising:
    determining that the first portion and the second portion lack a threshold extent of similarity with each other responsive to determining that the first portion of the media content includes a threshold extent of non-substantive media content.

18. The non-transitory computer-readable medium of claim 15, wherein the instruction code is executable by the processor to cause the computing system to perform further acts comprising:

presenting, via a user interface of the computing system, the second portion of the media content, and wherein taking action based on the identified second portion of the media content comprises causing supplemental content to be presented in conjunction with the portion of the media content being presented by the computing system.

19. A computing system configured for performing a set of acts comprising:

a communication interface;
a processor; and
a non-transitory computer-readable medium having stored thereon program instructions that upon execution by the processor, cause performance of a set of acts comprising:

receiving, via the communication interface, media content, wherein the media content comprises a first portion and a second portion;
generating a fingerprint of the second portion of the media content;
determining that the first portion of the media content includes a threshold extent of non-substantive media content;
responsive to determining that the first portion of the media content includes the threshold extend of non-substantive media content, transmitting the fingerprint to a content identification server to identify the second portion of the media content; and
performing an action based on the identified second portion of the media content.

20. The computing system of claim 19, wherein the computing system is connected to a receiver and is configured to receive the media content from the receiver.

* * * * *